(12) United States Patent
Strobel

(10) Patent No.: US 7,878,343 B2
(45) Date of Patent: Feb. 1, 2011

(54) STACKING COLUMN

(75) Inventor: Gustav Strobel, Saulgau (DE)

(73) Assignee: MTS Maschinenbau GmbH, Mengen (DE)

( * ) Notice: Subject to any disclaimer, the term of this patent is extended or adjusted under 35 U.S.C. 154(b) by 1085 days.

(21) Appl. No.: 10/566,692

(22) PCT Filed: Jul. 27, 2004

(86) PCT No.: PCT/EP2004/008385

§ 371 (c)(1),
(2), (4) Date: Jun. 9, 2006

(87) PCT Pub. No.: WO2005/012142

PCT Pub. Date: Feb. 10, 2005

(65) Prior Publication Data

US 2006/0226102 A1    Oct. 12, 2006

(30) Foreign Application Priority Data

Jul. 31, 2003   (DE) .................. 103 35 592

(51) Int. Cl.
*A47F 5/08* (2006.01)
(52) U.S. Cl. .................. 211/150; 211/54.1; 211/169
(58) Field of Classification Search .......... 211/150, 211/54.1, 41.15, 41.14, 26, 70, 183, 168, 211/169, 170, 171, 13.1, 70.4, 49.1, 41.1, 211/149, 164, 59.4, 184
See application file for complete search history.

(56) References Cited

U.S. PATENT DOCUMENTS

| | | | | |
|---|---|---|---|---|
| 3,241,852 A | * | 3/1966 | Muller et al. | 280/40 |
| 4,547,242 A | * | 10/1985 | Tusinski et al. | 156/105 |
| 5,217,121 A | * | 6/1993 | Walker | 211/41.1 |
| 5,301,824 A | * | 4/1994 | Schoeller | 211/150 |
| 5,373,756 A | * | 12/1994 | Schoeller | 74/527 |
| 5,411,234 A | * | 5/1995 | Schoeller | 248/345.1 |
| 5,938,051 A | * | 8/1999 | Scholler et al. | 211/150 |
| 5,988,777 A | * | 11/1999 | Schoeller | 312/9.58 |
| 6,234,328 B1 | * | 5/2001 | Mason | 211/90.02 |
| 6,234,743 B1 | * | 5/2001 | Strobel | 414/788.1 |
| 6,405,883 B1 | * | 6/2002 | Schambach | 211/150 |
| 7,070,058 B2 | * | 7/2006 | Strobel | 211/150 |
| 7,210,892 B2 | * | 5/2007 | Strobel | 414/788.1 |
| 7,350,649 B1 | * | 4/2008 | Martens | 211/90.02 |
| 2004/0050813 A1 | * | 3/2004 | Strobel | 211/150 |
| 2006/0226102 A1 | * | 10/2006 | Strobel | 211/150 |
| 2007/0056536 A1 | * | 3/2007 | Lanteires | 123/90.15 |
| 2007/0152544 A1 | * | 7/2007 | Strobel | 312/9.58 |

FOREIGN PATENT DOCUMENTS

| | | |
|---|---|---|
| DE | 3536251 | 12/1986 |
| DE | 3619688 | 12/1987 |
| DE | 3811310 | 10/1989 |
| EP | 0562417 | 9/1993 |

* cited by examiner

*Primary Examiner*—Darnell M Jayne
*Assistant Examiner*—Devin Barnett
(74) *Attorney, Agent, or Firm*—Alleman Hall McCoy Russell & Tuttle LLP

(57) ABSTRACT

The invention relates to a stacking column for holding warehouse items, in particular bodywork parts, on the support arms of ratchet levers, which pivot about a rotational axis from a resting position into a working position. Several ratchet levers are located above one another or next to one another and cooperate with one another. A supporting element, which in the working position lies on or against a preceding ratchet lever, rotates with the latter.

8 Claims, 5 Drawing Sheets

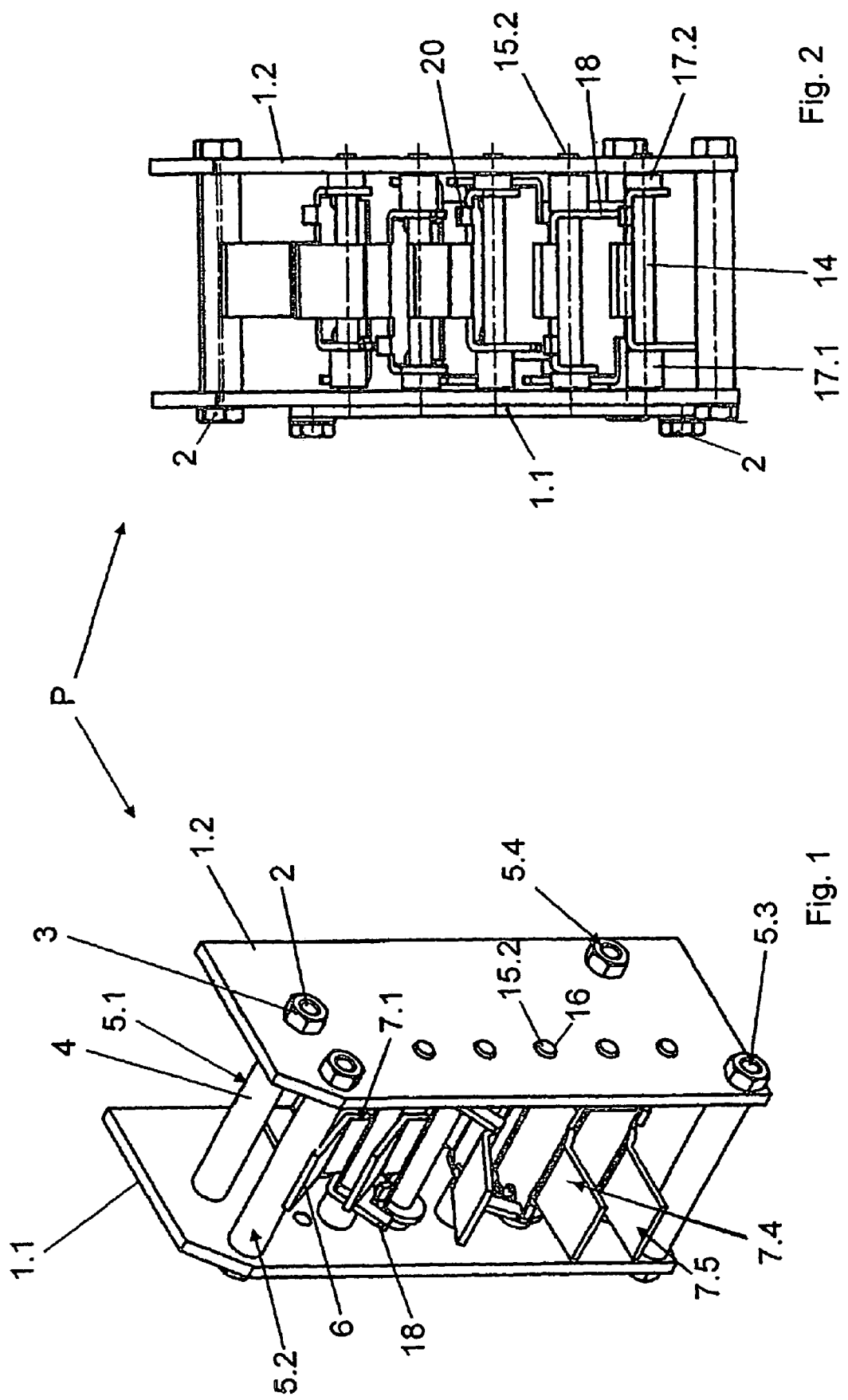

STACKING COLUMN

CROSS-REFERENCE TO RELATED APPLICATIONS

This is the national phase of PCT Application No. PCT/EP2004/008385 filed Jul. 27, 2004, which in turn claims priority to German Application No. 10335592.8 filed Jul. 31, 2003, the entire disclosures of each of which are hereby incorporated by reference into the present application for all purposes.

The invention relates to a stacking column for holding warehouse items, in particular bodywork parts, on the support arms of ratchet levers, which pivot around a rotational axis from a resting position into a working position, wherein a plurality of ratchet levers are located above one another or next to one another and co-operate with one another, as well as to a method for manufacturing a ratchet lever for use in such a stacking column.

PRIOR ART

Stacking columns are known in a variety of models and designs. Most of them are perpendicular stacking columns arranged in a rectangular configuration. For example, such stacking columns are shown in DE-PS 35 36 251, or also in DE-OS 38 11 310.

It may also be advisable for certain reasons to have these stacking columns be slanted, as depicted in DE-OS 41 33 464. Further, the stacking columns can also be horizontally arranged in accordance with DE-OS 40 20 864.

These stacking columns are preferably also enveloped by a protective section, as described in greater detail in EP-A 93 10 42 23.

In all of these stacking columns, the warehouse items lie in or on the support arms of ratchet levers, such that these ratchet levers return to their resting position right after the load has been removed. Further, it was discovered that individual ratchet levers again flip back into their resting position when the mounting frame jumps owing to unevenness in the road, e.g., during transport.

OBJECT OF THE INVENTION

The object of this invention is to provide a stacking column in which the ratchet levers can be secured in a working position even under no load.

DESCRIPTION OF THE INVENTION

The object of the invention is achieved by way of a supporting element that rotates with the ratchet lever, and either lies on or against a preceding ratchet lever in the working position.

This means that the supporting element rests against the lower or directly adjacent ratchet lever in the working position, and cannot automatically return to its resting position, even after the load has been removed. Therefore, the supporting element is preferably secured in a self-restraining manner.

In one exemplary embodiment, the supporting element can be designed as an independent element, and also lie on the rotational axis. It preferably underpins the ratchet lever allocated to it, and is positively joined with said ratchet lever. If the ratchet lever turns, so too does the supporting element.

In another preferred exemplary embodiment of the invention, the supporting element is integrally joined with the ratchet lever. In this case, the entire ratchet lever can be fabricated out of a sheet metal blank, from which the supporting element is folded. Protection is also desirable for this method alone, even absent the provision of a supporting element. It is characterized in that a sheet metal blank is provided with tongues to the respective sides of a middle section between the support arm and a control arm, and the tongues are provided with a respective recess that extends partially into the middle section, wherein each tongue is bent in the area of the recess. This means that the sheet metal blank and recesses are manufactured in one operation, and folding takes place in another operation. This cuts down significantly on the working time. The recesses create seats for the rotational axis, so that the ratchet lever need not be provided with any separate lugs or the like. This greatly simplifies ratchet lever production.

In a preferred exemplary embodiment of the method, the support arm and/or control arm are also folded from the middle section, depending on which support position the support arm or control position the control arm is to assume. If the control arm is to also serve as a stop or limit for the rotational movement of the ratchet lever, it is sufficient to fold up a lateral cheek from the control arm, which then strikes the next rotational axis in the working position.

If such a ratchet lever is used in conjunction with the aforementioned supporting element, it may be advisable to have one face of the supporting element be at least partially rounded, and allocate yet another guide tongue to the ratchet lever to help the supporting element to more easily slide onto the preceding ratchet lever. This guide tongue is used primarily to restrain the supporting element so that the latter does not just automatically exit the support position. To this end, it may make sense to fold the guide tongue up diagonally, or make it somewhat curved in shape. Of course, the curvature then interacts with the radius of the face of the supporting element.

Further, one exemplary embodiment of the invention envisages that the supporting element interacts with a ratchet lever that is actuated before it, so that this ratchet lever, acting by way of the supporting element, can move the next ratchet lever from a resting position to a ready position, or from a ready position into a working position. For this purpose, one exemplary embodiment provides for a bolt on the preceding ratchet lever that presses against a foot on the supporting element, thereby causing the next ratchet lever to pivot around its rotational axis.

In another exemplary embodiment of the invention, for which separate protection is also desirable, a stop lying against the rotational axis of the next ratchet lever in the working position projects up from the ratchet lever. This limits the rotational travel of the ratchet lever in a simple manner.

In order to limit the rotational travel, it may prove beneficial to have either the width of the stop or outer diameter of the rotational axis be selectable. In the latter case, it may again be easy to place a spacer ring with a selectable outer diameter on the rotational axis.

For the sake of simplicity, the stop can consist of the folded up lateral cheek when using a ratchet lever made from the aforementioned sheet metal blank.

A latching device is preferably also allocated to the ratchet levers configured in this way. This means that the last ratchet lever is securely held in its working position. Provided to this end is a slider, for example, which can move a stud, and presses it onto the uppermost ratchet lever.

Both the stud and a threaded section or guide pin project from the slider, wherein each of them passes through a parallel, curved elongated hole. In this way, the stud can be moved from a resting position into a locked position.

The slider can preferably be fixed in place both in a resting and locked position, which is accomplished by way of a tie bolt that passes through a corresponding hole in a lateral cheek. The tie bolt can be withdrawn from this hole by means of a control knob, which preferably takes place against the force exerted by a spring.

The rear area of known ratchet levers often has a weight that causes the ratchet lever to return to its ready or resting position after the object placing a load on the ratchet lever has been removed. In particular in cases where the ratchet levers are made to rest one against the other by the supporting elements according to the invention, however, the supporting effect exerted by the supporting elements may make this more difficult. In order to facilitate the return of the ratchet lever to the ready or resting position, springs that press the ratchet lever into the resting position should therefore be provided. In other words, the ratchet lever is moved from the resting position into the ready position, and preferably also into the working position, against the force exerted by the springs. The springs are preferably located in a shared spring rack. While protection is desired separately for this concept, it is especially important during the use of the supporting elements according to the invention.

DESCRIPTION OF FIGURES

Additional advantages, features and details of the invention can be obtained from the following description of preferred exemplary embodiments, as well as the drawing; shown on FIG. 1 is a perspective view of a stacking column according to the invention on a reduced scale;

FIG. 2 is a front view of the stacking column according to FIG. 1;

Figure 4:
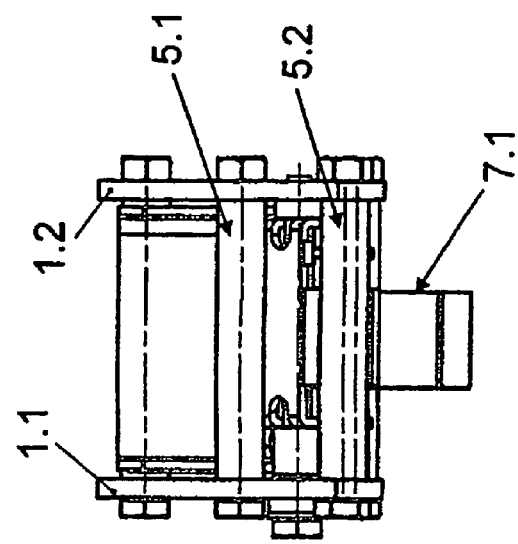
FIG. 4 is a top view of the stacking column according to FIG. 1.

A stacking column P according to the invention shown on FIG. 1 to 4 has two lateral cheeks 1.1 and 1.2, which are connected to each other. The respective connection is formed by way of a bolt 2, the end of which has a threaded section, wherein this threaded section passes through the lateral cheeks 1.1 and 1.2. A respective nut 3 is placed on the threaded section. A spacer tube 4 encompasses the bolt 2 between the lateral cheeks 1.1 and 1.2.

The position of an upper connecting element 5.2 is selected in such a way that a support arm 6 of an uppermost ratchet lever 7.1 lies against it in the resting position, disappearing between the lateral cheeks 1.1 and 1.2 in the process.

Figure 3:
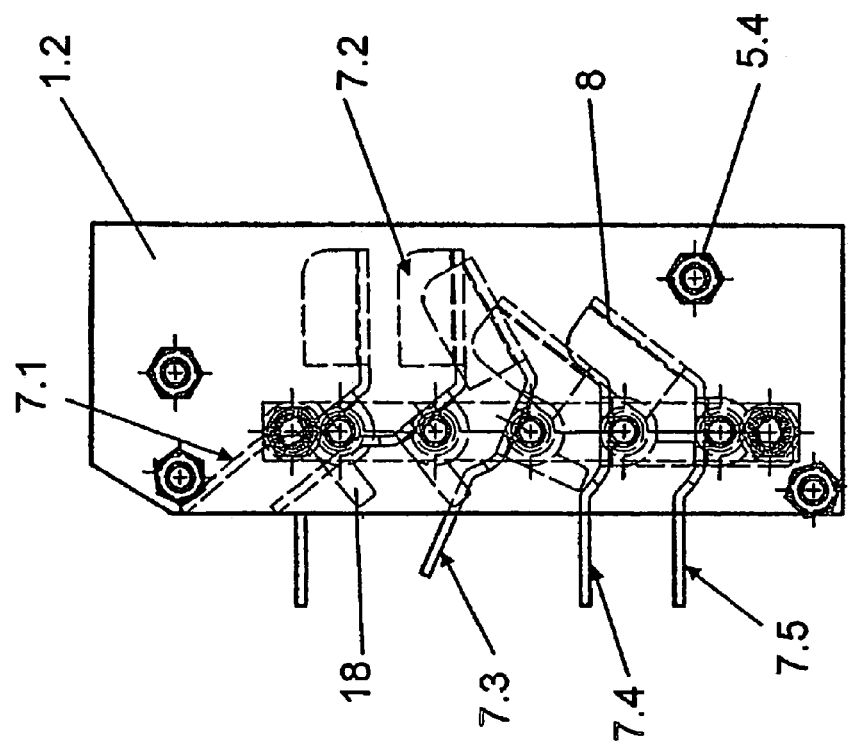
FIG. 3 is a side view of the stacking column according to FIG. 1.

The position of the connecting element 5.4 is again selected in such a way that a control arm 8 of a bottom ratchet lever 7.5 lies against it in the ready position, so that its support arm 6, as shown on FIG. 3 for the ratchet lever 7.3, peeks out of the lateral cheeks 1.1 and 1.2, and is ready to accommodate a warehouse item.

While only five ratchet levers 7.1 to 7.5 are shown between the lateral cheeks 1.1 and 1.2 in this exemplary embodiment, any number desired can of course be provided, wherein the lateral cheeks 1.1 and 1.2 are then made longer. The ratchet levers 7.1 and 7.2 are in a resting position, the ratchet lever 7.3 is in a ready position, and the ratchet levers 7.4 and 7.5 are in the working position.

Figure 6:
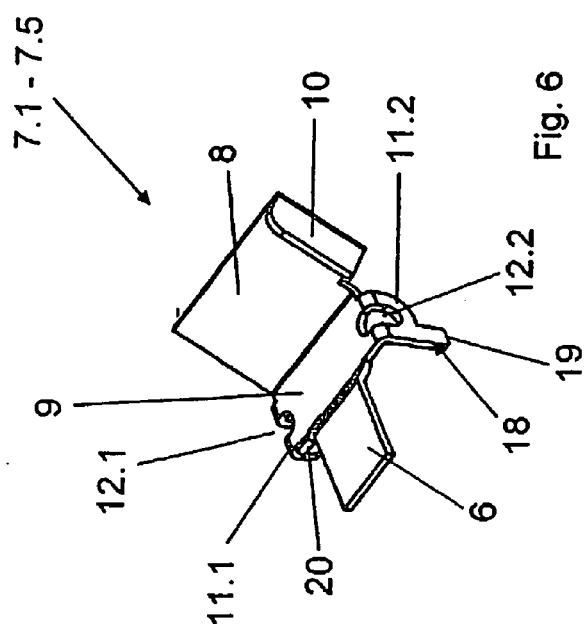
FIG. 6 is a perspective view of a ratchet lever according to the invention.

FIG. 6 shows a ratchet lever according to the invention. It is preferably made out of a sheet metal blank, as will be described later on. The control arm 8 on the one hand, and the support arm 7 on the other, are folded from a rectangular middle section 9. The fold configuration and scale depend on the respective requirements, primarily on the location in which the support arm is to be while in the working position. A lateral cheek 10 projects up from the control arm 8, and its function will be described later on.

Two tongues 11.1 and 11.2 project down at roughly a right angle to the side of the middle section 9, wherein respective recesses 12.1 and 12.2 can be discerned in the area of the tongues 11.1 and 11.2 or the adjacent region of the middle section 9, serving to accommodate a rotational axis 13. Each rotational axis 13 has a bolt section 14 with a larger outside diameter accommodated between the lateral cheeks 1.1 and 1.2, both ends of which have a respective bearing bolt 15.1 and 15.2, which is incorporated into a bearing borehole 16 in the lateral cheeks 1.1 and 1.2. The rotational axis 13 hence turns in these bearing boreholes 16. The ratchet lever 7.1 to 7.5 rotates around the rotational axis 13 or together with it.

Figure 5:
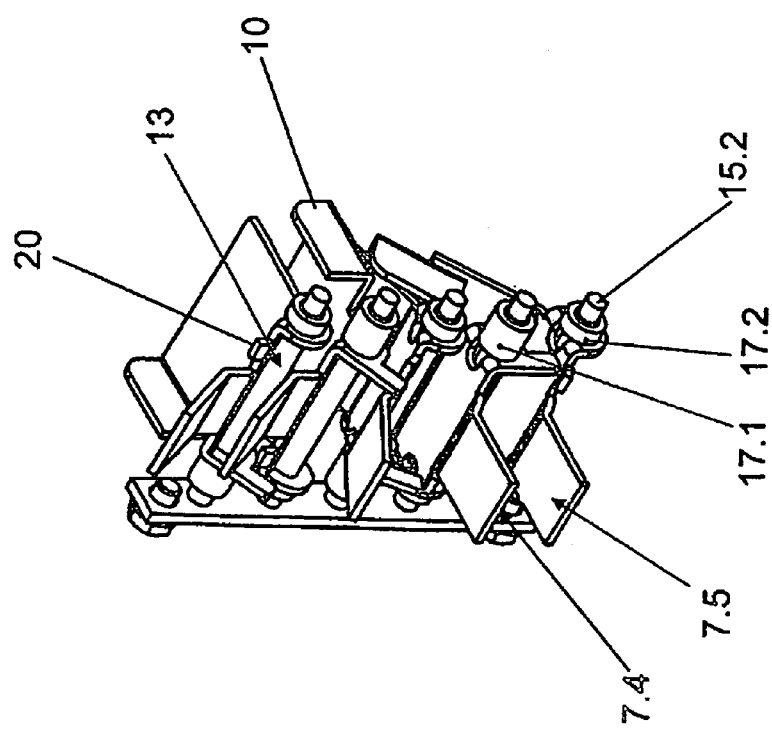
FIG. 5 is a perspective view showing the mechanism of action for the ratchet levers inside a stacking column.

Also placed upon the rotational axis 13 are spacer rings 17.1 and 17.2 (see FIG. 5), wherein these spacer rings can vary in width.

A supporting element 18 also projects down from at least one tongue 11.2. Its face 19 can be at least partially rounded.

Discernible in addition to the support arm 6 is a guide tongue 20, which projects up somewhat. This guide tongue 20 could also be somewhat curved toward the middle section 9.

The invention works as follows:

The ratchet lever 7.1 to 7.5 according to the invention is manufactured by stamping a corresponding flat blank out of a sheet metal strip. At the same time, the recesses 12.1 and 12.2 are also stamped out. This is followed by folding the tongues 11.1 and 11.2 in the area of these recesses 12.1 and 12.2, so that a rotational axis 13 can be passed through. The middle section 9 here is located either above the rotational axis 13 as shown on FIG. 1 to 5, or below the rotational axis as shown on FIG. 7.

The support arm 6 and control arm 8 are also folded from the middle section 9, while the lateral cheek 10 is folded from the control arm 8.

The spacer rings 17.1 and 17.2 are also placed on the rotational axis 13, wherein their outer diameter is selected based on how far the ratchet lever 7.1 to 7.5 is to rotate around the rotational axis 13. The outer diameter and/or height of the lateral cheek 10 limit the rotational travel.

The entire arrangement consisting of rotational axis 13, ratchet lever 7.1 to 7.5 and spacer rings 17.1 and 17.2 is now inserted between the lateral cheeks 1.1 and 1.2, wherein the bearing bolts 15 engage the corresponding bearing boreholes 16. The stacking column is now ready for holding warehouse items, wherein the bottom ratchet lever 7.5 is in the ready position, since its control arm 8 lies against the connecting element.

If the ratchet lever 7.5 is now moved from the ready position to the working position shown on FIG. 3, the control arm 8 of the bottom ratchet lever 7.5 strikes the overlying control arm of the ratchet lever 7.4 after a short rotational travel, and presses this control arm up. This moves the ratchet lever 7.4 from a resting position into the ready position.

The rotational travel of the ratchet lever 7.5 is limited by the lateral cheeks 10 striking the spacer ring 17.2.

If the ratchet lever 7.4 or subsequent ratchet levers are now moved from the respective ready position into the working position, the face 19 of the supporting element 18 slides onto the guide tongue 20 shortly before the working position is reached, and directly rests against the middle section 9 or another area of the guide tongue 20 in the working position. Because the guide tongue 20 is bent up somewhat, a self-restraining effect comes about, so that the supporting element 18 does not exit the support position without external exposure. Only when the uppermost ratchet 7.1 is moved out of its working position does the control arm 8 fall onto the underlying control arm, so that its supporting element is also moved out of the self-restraining latching position, and the ratchets move to the resting position like dominoes (except for the bottom ratchet lever 7.5).

Figure 7:
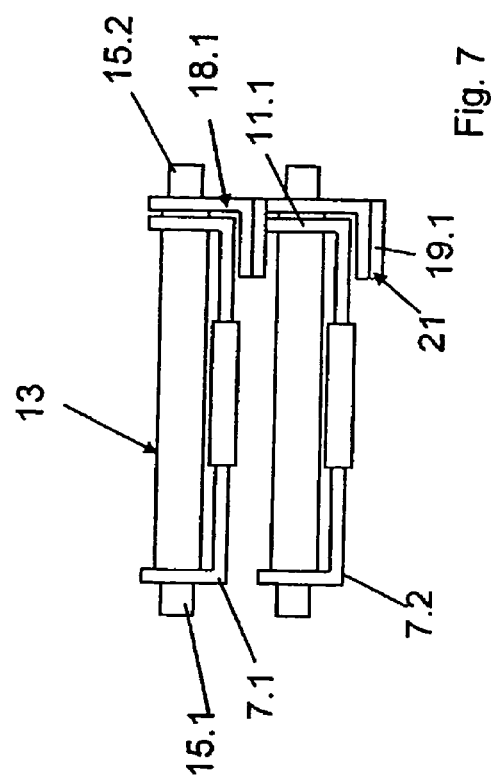
FIG. 7 is a front view of two ratchet levers with another embodiment of a supporting element.

FIG. 7 shows another exemplary embodiment of a supporting element 18.1. The latter is no longer integrally connected with the ratchet lever 7.1 or 7.2, but rather secured as an independent element of the rotational axis 13. It is angular, and underpins the ratchet lever 7.1 and 7.2 with a supporting leg 21. One face 19.1 of the support leg 21 is preferably crowned or rounded, and pivots in the working position over the apex of the tongue 11.1 of the underlying ratchet lever 7.2, and over the corresponding apex of the underlying supporting element, where it is clamped in place. This supporting element 18.1 can be made out of metal, or even plastic. Other supporting elements are also conceivable. What is important is that they pivot together with the ratchet lever around its rotational axis in a support position.

Figure 8:
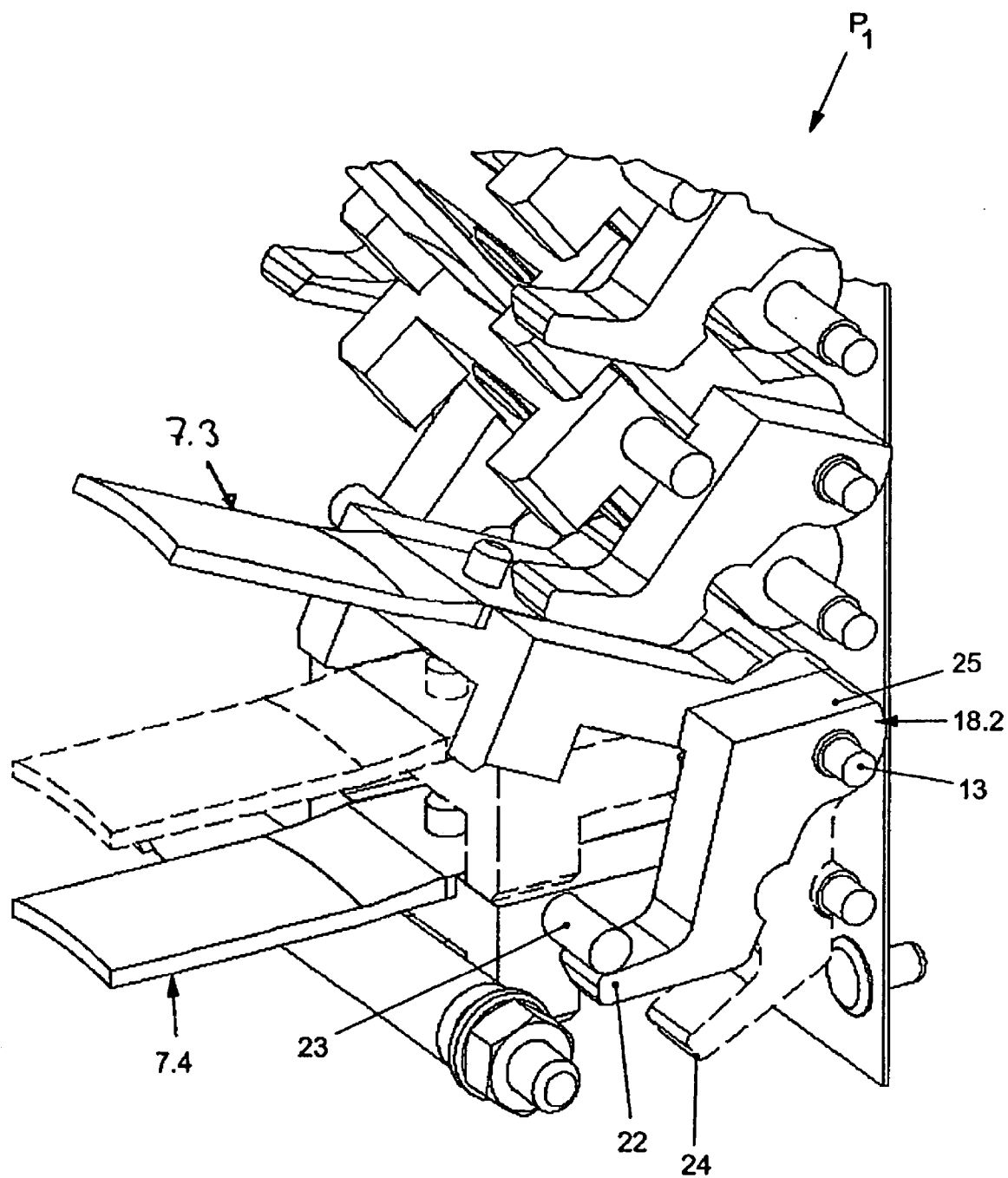
FIG. 8 is a perspective view showing part of another exemplary embodiment of a stacking column according to the invention.

In another exemplary embodiment of a stacking column $P_1$ according to the invention shown on FIG. 8, a supporting element 18.2 is arranged next to the ratchet lever 7.3 on the same rotational axis 13. This ratchet lever 7.3 is shown in the ready position, with the dashed lines denoting how it would look in the working position.

The supporting element 18.2 forms a foot 22 below, which interacts with a lateral bolt 23 on the underlying ratchet lever 7.4. The bolt 23 and foot 22 are adjusted relative to each other in such a way that the ratchet lever 7.4 takes the overlying ratchet lever 7.3 in the ready position along as it swivels into the working position.

If the ratchet lever 7.3 is then also loaded and moved to the working position, a foot tip 24 or an entire foot surface presses against the supporting surface 25 of the underlying supporting element, thereby fixing the underlying ratchet lever 7.4 in place.

Figures 9, 10:
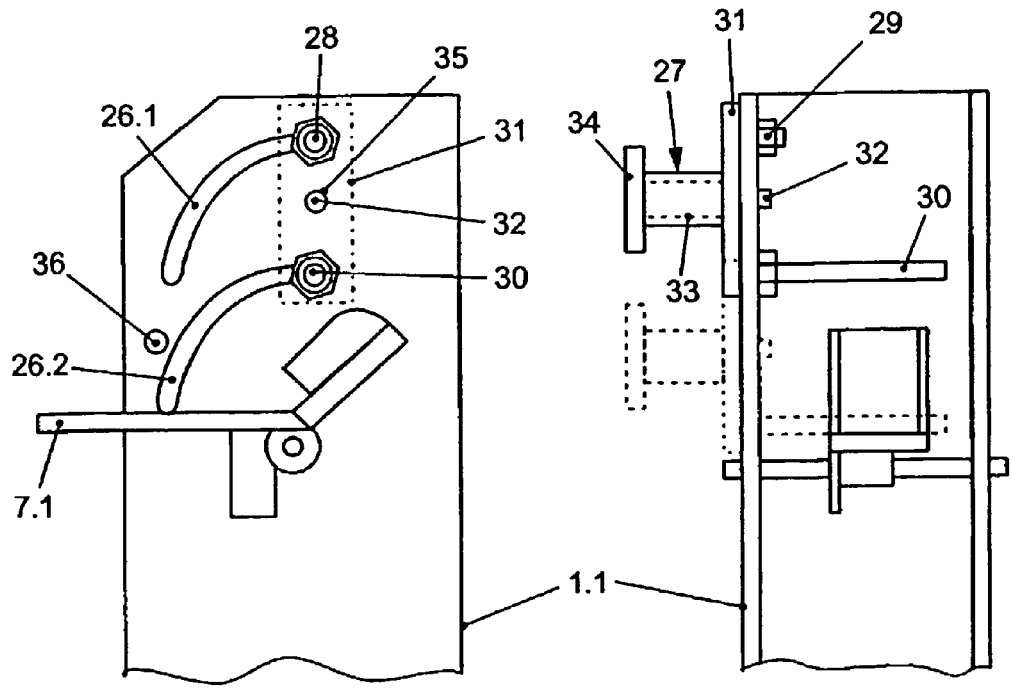
FIG. 9 is a partially depicted top view of an open stacking column in the area of a latching device.
FIG. 10 is a front view of the area from the stacking column according to FIG. 9.

FIGS. 9 and 10 show a possible way of latching all ratchet levers in the working position. Only the uppermost ratchet lever 7.1 of the ratchet levers is depicted.

Situated above the ratchet lever 7.1 in the lateral cheek 1.1 are two roughly parallel, curved elongated holes 26.1 and 26.2. These elongated holes 26.1 and 26.2 are used to guide a latching device 27. The latter passes through the elongated hole 26.1 with a threaded section 28, upon which a screw 29 is placed. Further, it passes through the elongated hole 26.2 with a stud 30. The stud 30 and threaded section 28 project from a slider 31, so that both can be guided into the elongated holes 26.1 and 26.2 by the slider 31.

The slider 31 and lateral cheek 1.1 are traversed by a tie bolt 32, which is spring-mounted in a cylindrical sleeve 33. The tie bolt 32 is connected with a control knob 34 at the other end of the cylindrical sleeve 33.

The latching device 27 on FIG. 9 is shown outside the latching position. It is held in this position by the tie bolt 32, which passes through a corresponding hole 35 in the lateral cheek 1.1.

As soon as the uppermost ratchet 7.1 is in the working position, the tie bolt 3 is pulled out of the hole 35 against the spring force via the control knob 34, and the slider 31 is moved to its latching position, shown with dashed lines on FIG. 10. In this position, the stud 30 presses against the ratchet lever 7.1, and secures it in the working position. The slider 31 is then held in this position after releasing the control knob 34, wherein the tie bolt 32 enters another hole 36 in the lateral cheek 1.1.

Figure 11:
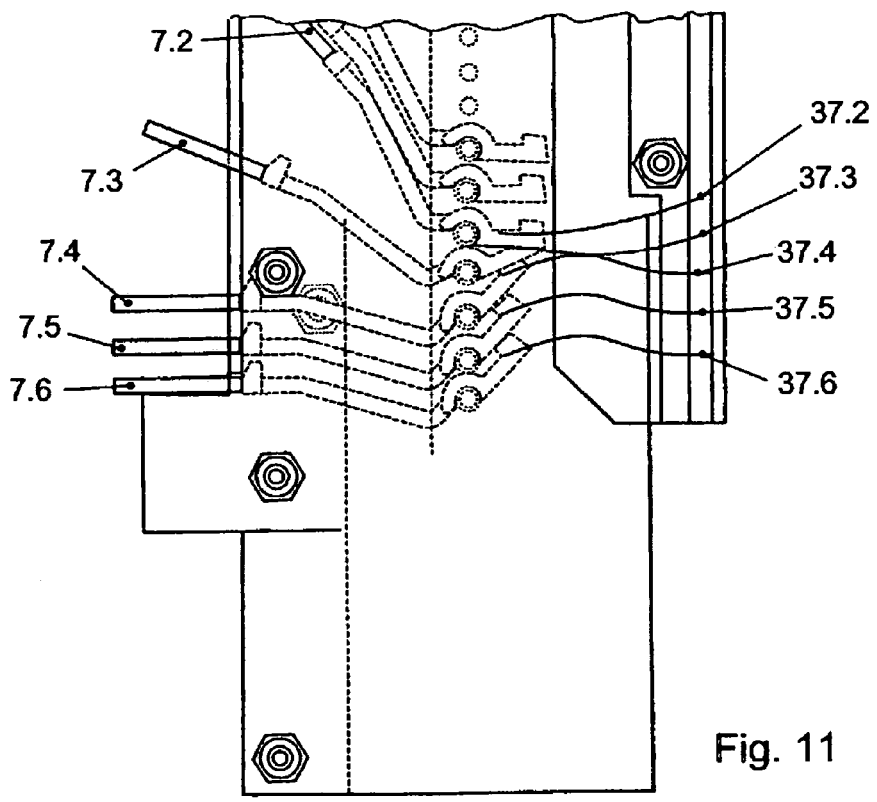
FIG. 11 is a schematic side view of another exemplary embodiment of a stacking column.

According to FIG. 11, springs 37.2 to 37.6 are to be allocated to the respective ratchet levers 7.2 to 7.6. These springs are located in a spring rack 38. They are configured in such a way that the ratchet levers 7.2-7.6 pivot from a resting position to a working position against the force exerted by these springs. This means that the ratchet levers 7.2-7.5 return to their resting position down to the bottom ratchet lever 7.6, e.g., when the latch is released according to FIGS. 9 and 10. The bottom ratchet lever 7.6 is guided into the ready position by its spring 37.6. In particular, this improves the detachment of supporting elements from their support position.

| | Item Number List |
|---|---|
| 1 | Lateral cheek |
| 2 | Bolt |
| 3 | Nut |
| 4 | Spacer tube |
| 5 | Connecting element |
| 6 | Support arm |
| 7 | Ratchet lever |
| 8 | Control arm |
| 9 | Middle section |
| 10 | Lateral cheek |
| 11 | Tongue |
| 12 | Recess |
| 13 | Rotational axis |
| 14 | Bolt section |
| 15 | Bearing bolt |
| 16 | Bearing borehole |
| 17 | Spacer ring |
| 18 | Supporting element |
| 19 | Face |
| 20 | Guide tongue |
| 21 | Support leg |
| 22 | Foot |
| 23 | Bolt |
| 24 | Foot tip |
| 25 | Supporting surface |
| 26 | Elongated hole |
| 27 | Latching device |
| 28 | Threaded section |
| 29 | Screw |
| 30 | Stud |
| 31 | Slider |
| 32 | Tie bolt |
| 33 | Cylindrical sleeve |
| 34 | Control knob |
| 35 | Hole |
| 36 | Hole |
| 37 | Springs |
| 38 | Spring rack |
| 39 | |

-continued

Item Number List

| | |
|---|---|
| 40 | |
| 41 | |
| 42 | |
| 43 | |
| 44 | |
| 45 | |
| 46 | |
| 47 | |
| 48 | |
| 49 | |
| 50 | |
| 51 | |
| 52 | |
| 53 | |
| 54 | |
| 55 | |
| 56 | |
| 57 | |
| 58 | |
| 59 | |
| 60 | |
| 61 | |
| 62 | |
| 63 | |
| 64 | |
| 65 | |
| 66 | |
| 67 | |
| 68 | |
| 69 | |
| 70 | |
| 71 | |
| 72 | |
| 73 | |
| 74 | |
| 75 | |
| 76 | |
| 77 | |
| 78 | |
| 79 | |
| P | Stacking column |

The invention claimed is:

1. A stacking column for holding warehouse items on support arms of ratchet levers which pivot around a rotational axis from a resting position into a working position, the stacking column comprising a plurality of ratchet levers that are located adjacent to one another and co-operate with one another, wherein a supporting element rotates with each ratchet lever of the plurality of ratchet levers and lies on or against an underlying ratchet lever in the working position, wherein, for each ratchet lever and supporting element of the plurality of ratchet levers and supporting elements, the supporting element is either integral with the ratchet lever at the rotational axis or the supporting element is independently secured to the rotational axis as a separate part from the ratchet lever, each ratchet lever of the plurality of ratchet levers further comprising at least one control arm on an opposing end relative to a support arm, the control arm including a lateral cheek which projects upwardly from the control arm, the lateral cheek contacting a spacer ring of an overlying ratchet lever in the working position, the spacer ring being positioned around the rotational axis.

2. The stacking column of claim 1, wherein the warehouse items comprise bodywork parts.

3. The stacking column according to claim 1, wherein the lateral cheek comprises sheet metal.

4. The stacking column according to claim 1, wherein each of the plurality of ratchet levers has a guide tongue which extends toward an overlying ratchet lever, the guide tongue abutting a face of the supporting element of the overlying ratchet lever in the working position.

5. The stacking column according to claim 1, wherein the guide tongue is at least partially upwardly directed.

6. The stacking column according to claim 1, wherein the guide tongue is at least partially curved.

7. A stacking column for holding warehouse items on support arms of ratchet levers which pivot around a rotational axis from a resting position into a working position, the stacking column comprising a plurality of ratchet levers that are located adjacent to one another, wherein each ratchet lever of the plurality of ratchet levers comprises a support arm, a control arm on an opposing end relative to the support arm, the control arm comprising an upwardly projecting lateral cheek, and a supporting element that rotates with each ratchet lever of the plurality of ratchet levers and lies on or against an underlying ratchet lever in the working position, wherein the support arm, the control arm, and the supporting element comprise a folded sheet metal blank, or the supporting element is secured to the rotational axis as a separate part, the upwardly projecting lateral cheek contacting a spacer ring of an overlying ratchet lever in the working position, the spacer ring being positioned around the rotational axis.

8. A stacking column for holding warehouse items on support arms of ratchet levers which pivot around a rotational axis from a resting position into a working position, the stacking column comprising a plurality of ratchet levers that are located adjacent to one another and co-operate with one another, wherein each ratchet lever of the plurality of ratchet levers comprises a supporting element that rotates with each ratchet lever of the plurality of ratchet levers and lies on or against an underlying ratchet lever in the working position, and wherein each ratchet lever of the plurality of ratchet levers also comprises a control arm on an opposing end relative to a support arm, the control arm comprising an upwardly projecting lateral cheek, wherein the upwardly projecting lateral cheek contacts a spacer ring of an overlying ratchet lever in the working position, the spacer ring being positioned around the rotational axis.

* * * * *